US008478990B2

(12) United States Patent  (10) Patent No.: US 8,478,990 B2
Brown et al.  (45) Date of Patent: Jul. 2, 2013

(54) MOBILE TRANSACTION METHODS AND DEVICES WITH THREE-DIMENSIONAL COLORGRAM TOKENS

(75) Inventors: Kerry D. Brown, Portola Valley, CA (US); Michael Keith Bond, Cambridge (GB); Ronald P. Knapp, Los Altos, CA (US); Peter Landrock, Cambridge (GB)

(73) Assignee: Cryptite LLC, Portola Valley, CA (US)

( * ) Notice: Subject to any disclaimer, the term of this patent is extended or adjusted under 35 U.S.C. 154(b) by 182 days.

(21) Appl. No.: 13/151,397

(22) Filed: Jun. 2, 2011

(65) Prior Publication Data

US 2012/0311320 A1  Dec. 6, 2012

(51) Int. Cl.
*H04L 29/06* (2006.01)
(52) U.S. Cl.
USPC ........................................... 713/155; 713/186
(58) Field of Classification Search
USPC .................................................. 713/155, 186
See application file for complete search history.

(56) References Cited

U.S. PATENT DOCUMENTS

2008/0307515 A1* 12/2008 Drokov et al. ..................... 726/7
2010/0219234 A1*  9/2010 Forbes .......................... 235/375

* cited by examiner

*Primary Examiner* — Jeffrey Pwu
*Assistant Examiner* — Thong Truong
(74) *Attorney, Agent, or Firm* — Richard B. Main; Main Law Firm

(57) ABSTRACT

A transaction security process includes authentication and identification parts for pushing an encrypted colorgram for user authentication and persona descriptors for user identification from a transaction server to a first personal trusted device. A decryption of the colorgram is displayed on the first personal trusted device. An image is captured by a second personal trusted device. An encryption of the image captured from the second personal trusted device is uploaded to the transaction server. The persona descriptors are used to build a composite rendering for identification of the first user to the second user. The second user clicks "OK" if they recognize the composite drawing as a reasonable persona of the first user.

3 Claims, 14 Drawing Sheets

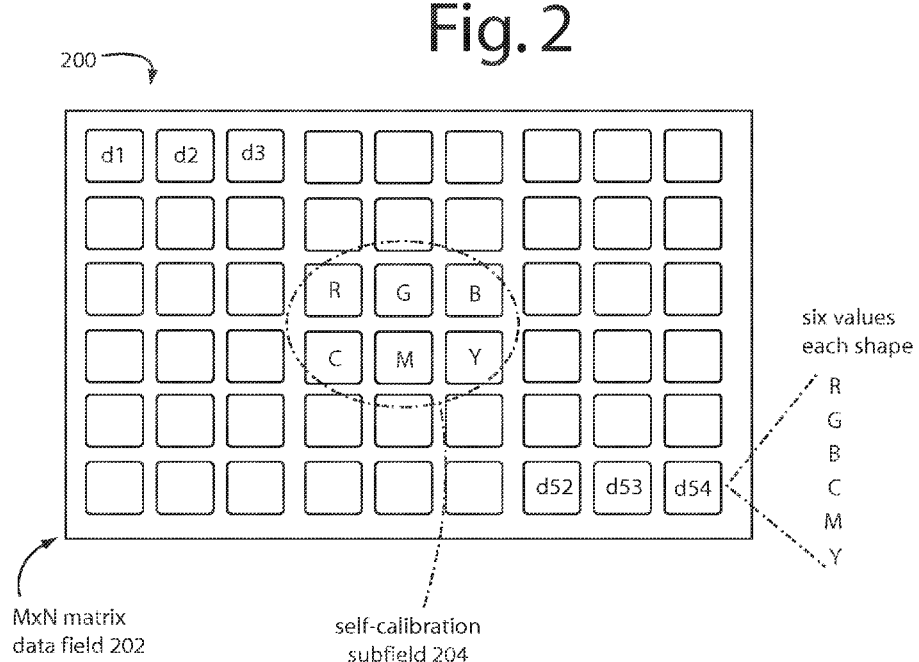
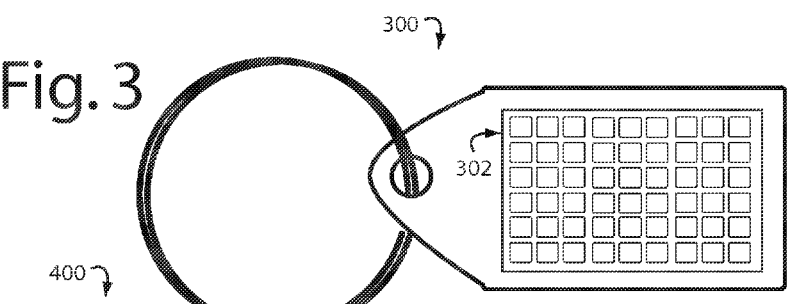
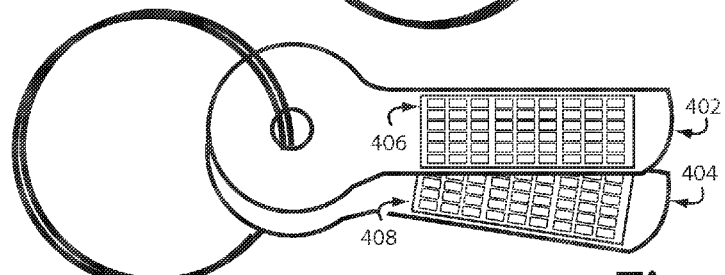

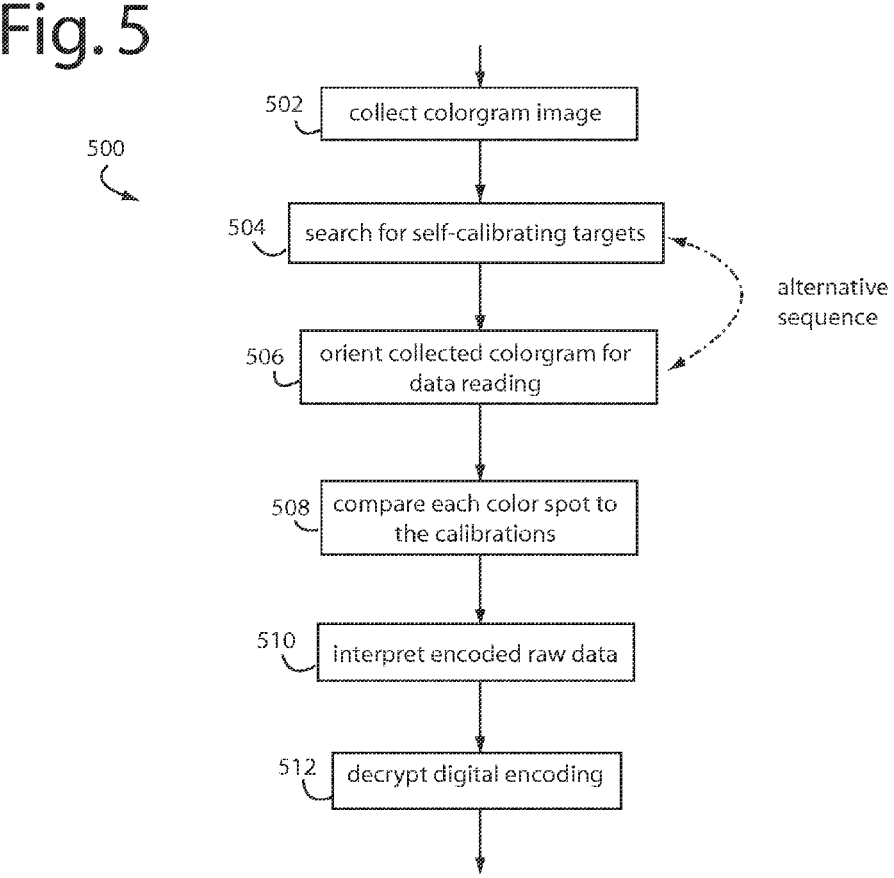

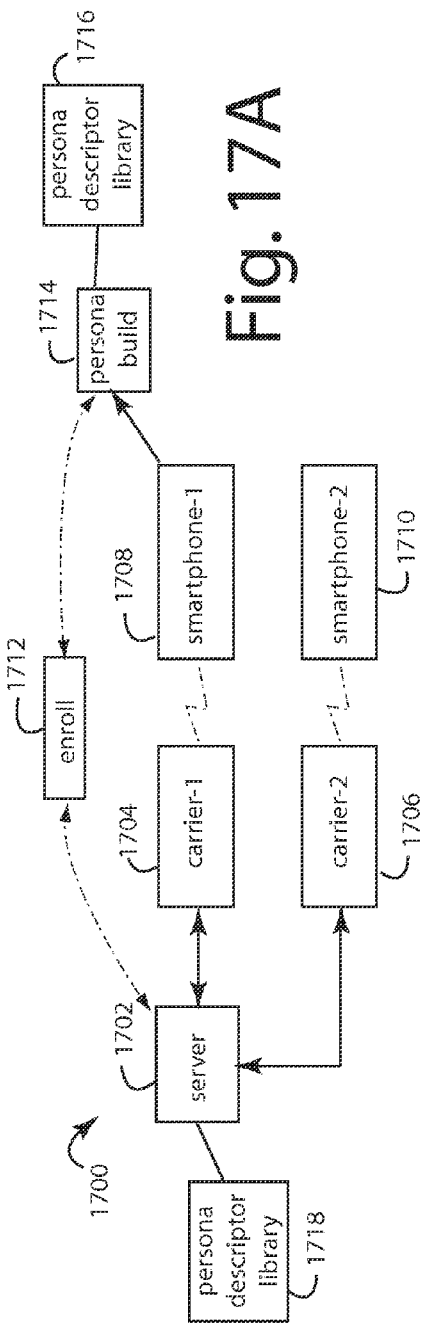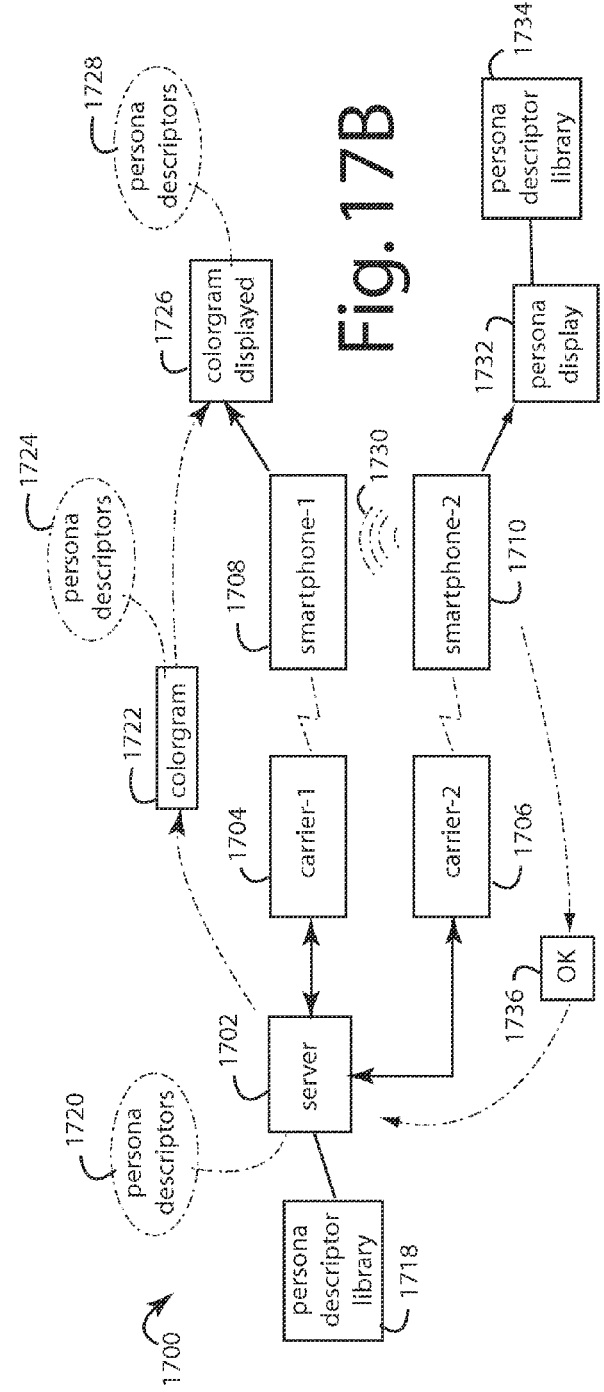

MOBILE TRANSACTION METHODS AND DEVICES WITH THREE-DIMENSIONAL COLORGRAM TOKENS

BACKGROUND OF THE INVENTION

1. Field of the Invention

The present invention relates generally to devices for identifying and authenticating users to devices and online websites, and more specifically to methods for increasing security levels to meet stringent financial, transaction-level assurance requirements in mobile devices by incorporating three-dimensional colorgram tokens.

2. Description of Related Art

The usual methods commonly employed to identify and authenticate users of mobile electronic appliances have generally not risen to the security levels required for non-trivial financial transactions. Even the common two-factor authentications that require a payment card and a personal-identification-number (PIN) as what-you-have and what-you-know factors have been subject to fraud and other abuses. On-line, card-not-present transactions have been even more difficult to secure.

The average user cannot commit to memory sufficiently complex passcodes that would allow the derivation of a cryptographic key for use to secure transactions and authenticate users, such typically have a 112 bit minimum entropy requirement. Such users are also overly challenged when required to have a different passcode for every secure website they visit. Most users simply repeat the use of a few favorite passcodes and then don't change them often enough. Such passcodes are thus easily compromised via brute force or by carrying over an attack on one website to another.

Authentication factors are manifested in data collections that can be used to authenticate or verify the identity of an individual. Two-factor authentication employs two different authentication factors to increase the level of security beyond what is possible with only one of the constituents. For example, one kind of authentication factor includes what-you-have, e.g., an credit card, the SIM card typical to many mobile devices and Personal Trusted Devices (PTDs), or other type of object that is unique and difficult to duplicate. Another type of authentication factor includes what-you-know, such as a user passcode, a PIN like those used for accessing ATM machines at banks, zip code, or other pieces of personal and private information. A third kind of authentication factor includes who-you-are, for example a personal signature, a voice sample, a fingerprint, an iris scan, or other type of biometric.

Using more than one authentication factor results in what is sometimes called "strong authentication" or "multi-factor authentication." A very common use of strong authentication generally includes just two different factors, the what-you-know and what-you-have authentication factors.

Barcodes and conventional one or two dimensional (1D, 2D) codes do not have the data storage capacity needed to make an effective what-you-know security factor out of them. They typically have been used for serial numbers and stock keeping unit identifiers. Such traditional devices are so limited that they could not be expected to carry much information. This is usually due to standardized geometries that can't be easily scaled, and standardized use of black and white spaces to delineate data elements.

When smartphones and other personal mobile electronic devices are used for secure access and to make consumer financial transactions, the loss of the device can be devastating and costly unless appropriate measures are taken. What is needed are methods and even a personal mobile security appliance that can prevent unauthorized use even when the appliance itself has fallen into the wrong hands.

Igor Drokov, et al., describe a dynamic multifactor authentication method and system in United States patent application, US 2008/0307515 A1, published Dec. 11, 2008. A user's mobile device is used to optically capture a first token sent to an access computer terminal by a remote authentication server. The user's mobile device is used to derive a second token that is independently returned to the same remote authentication server. If the second token is validated as having been properly derived from the first token, an authentication signal is generated so the transaction can be completed. Such a system may be appropriate for on-line transactions and desktop computer-based transactions, but has not been applied to peer-to-peer transactions using mobile devices.

Desktop and laptop computers have factory calibrated red, green, and blue ("RGB") color displays that produce consistent colors within a wide color gamut because image size is not a significant concern. But the screens on smartphones have a limited color gamut and smaller displays.

PayPal recently made a "bump technology" Android "app" available to enable peer-to-peer funds transfers between mobile device users. Users and their transactions are authenticated when mobile devices are literally bumped together. The data coincidence of the accelerometer synchronizes in time and the devices coexisting in a single location generates two independent streams of data that can be matched and authenticated by a remote transaction server, in this case PayPal. Consumers are expected to become increasingly comfortable using their cellphones to engage in so-called "micro-transactions". Highly secure user identification and authentication remains a problem with this fledgling bump technology where phone numbers are the only passcode, in addition to unique, but easily accessed, mobile device-related data from SIM cards, UUID/UDID, MAC address, etc.

Herein, a personal trusted device (PTD) can include feature phones, smartphones, and small laptops. These universally have crypto-libraries, powerful processors, and similar resources that are minimally needed for high security decryption jobs. The primary difference between a feature phone and a smartphone is the user cannot download non-embedded or third party applications (apps) to a feature phone, they are already installed as embedded applications by the manufacturer. A smartphone can download apps, e.g., Android and iPhone apps, to extend functionality.

SUMMARY OF THE INVENTION

Briefly, a smartphone app embodiment of the present invention includes a transaction security process for pushing an encrypted colorgram with persona descriptors from a transaction server over a network to a first mobile wireless smartphone. Then, a decryption of the colorgram is displayed on the first personal trusted device. A video image of it is captured with a camera of a second personal trusted device. An encryption of the image captured from the second personal trusted device is uploaded to the transaction server and the persona descriptors are used to build a composite rendering that should resemble the first user. The second user clicks "OK" if they recognize the composite drawing as a reasonable persona of the first user.

An associated transaction between independent users respectively equipped with the first and second personal trusted devices is authenticated based on a comparison of the encrypted colorgram that was pushed to the first mobile wireless smart or feature phone and what was uploaded from the second mobile wireless smart or feature phone for decryption within the phone, or by remote server.

Colorgrams may be printed on a decal, sticker, card, or other media. They are used to authenticate users to personal trusted devices to enable secure eWallet, vault, and similar device-based functions using embedded cryptographic libraries and processors. Colorgrams further provide data payload for consumer value-added functions, e.g., comparative shopping, secret URLS and passcodes, and coupons or other loyalty program references.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 2 is a diagram of a colorgram embodiment of the present invention;

FIG. 3 is a diagram of a key fob embodiment of the present invention with a colorgram;

FIG. 4 is a diagram of a key ring embodiment of the present invention with several keys each having its own colorgram;

FIG. 5 is a flowchart diagram of a computer subroutine to read and interpret colorgrams and to extract their digital encodings;

FIG. 9 is a dataflow diagram for initializing the vault of FIG. 8;

FIG. 10 is a dataflow diagram for opening the vault of FIG. 8 when offline;

FIG. 11 is a dataflow diagram for opening the vault of FIG. 8 when online;

FIG. 12 is a dataflow diagram for encrypting files for the vault of FIG. 8 when offline;

FIG. 13 is a dataflow diagram for encrypting files for the vault of FIG. 8 when online;

FIG. 14 is a dataflow diagram for decrypting files from the vault of FIG. 8 when offline;

FIG. 15 is a dataflow diagram for decrypting files from the vault of FIG. 8 when online;

FIG. 16 is a dataflow diagram for recovering a lost or damaged vault of FIG. 8; and FIGS. 17A and 17B are functional block diagrams representing an electronic transaction security method for authenticating transfers between independent users each equipped with a personal trusted device.

DETAILED DESCRIPTION OF THE INVENTION

Figure 1:
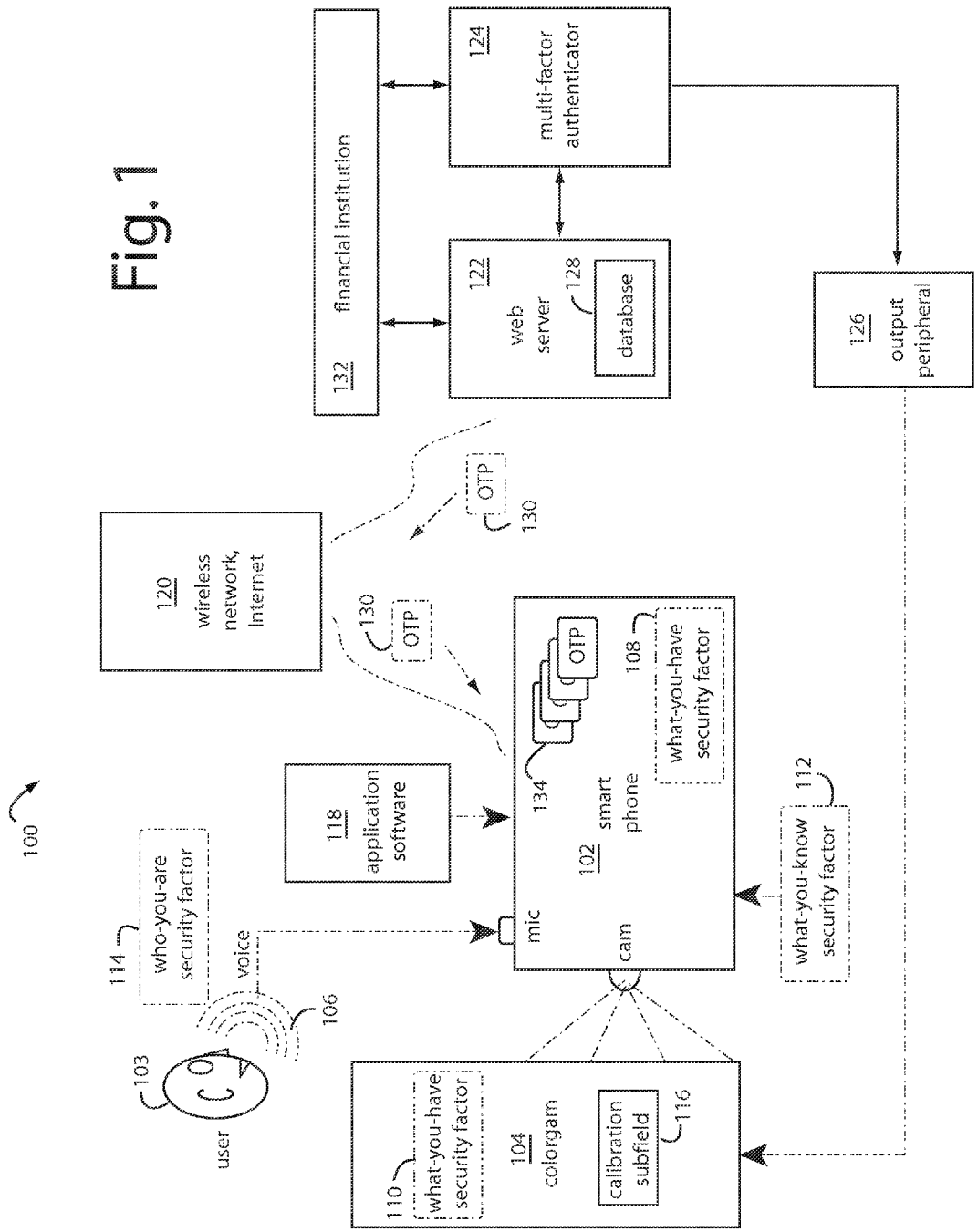
FIG. 1 is a functional block diagram of a highly specialized application of an encrypted colorgram system embodiment of the present invention.

In general, a first group of embodiments of the present invention provide security gateways for applications and social networking accessed by consumer mobile devices. An email client database, private photos, private documents, and other personal and confidential files can be encrypted in files on a user's mobile device with cryptographic keys in the encoded visual form of colorgrams. Users' data and links to "apps" are displayed as icons in an encrypted vault, and selecting one of them will launch an auto-capture sequence, extract the corresponding key from a captured colorgram, use this to recover a passcode-session key from the encrypted data in the vault, and then launch the appropriate website or file viewer.

Alternatively, the "app" link may use a key read from the captured colorgram to generate a One-Time Passcode (OTP) that will enable the user to log on to a bank account for a higher level of security. The embodiments then auto-fill the respective login data for the website, including specific user ID and passcode maintained in the mobile device encrypted file. A watchdog timer may be included to close the encrypted folder vault when it has been idle more than a predetermined time.

A principal advantage of these embodiments of the present invention is that a secure web server can be used to push new, very long and complex passcodes to each of the apps in the encrypted folder vault on a regular basis. The users never have to deal with the highly secure passcodes directly. The new passcodes can be generated with Advanced Encryption Standard (AES) cryptography, for example on a Hardware Secure Module (HSM), and have superior cryptographic strength to anything users would choose or be able to remember for themselves. All the passcodes can be updated regularly, and the user can print them out if needed. The security of each site is thus strengthened, and users are authenticated to their own encrypted folder vaults in their personal trusted device. Multiple encrypted folder vaults, each accessed with a separate colorgram, can provide for sharing of a single mobile device by multiple users.

Embodiments of the present invention include methods of authenticating users to mobile devices and web systems through a combination of novel authentication factors. A colorgram's geometry and suite of colors is used to encode hundreds of bits of information. Each user keeps a copy of the colorgram in their possession, e.g., printed on a piece of paper, and the data in the colorgram can then be captured by a smartphone using the camera on the phone, if the user keys in a passphrase or a PIN to enable a decoding of the colorgram. Each colorgram may be individually coded to be interpreted by a single PTD only. Such a colorgram would be meaningless in the hands of another user.

The first step in the decoding process may be to use some of the bits to verify that the passphrase and/or the PIN keyed in by the user is correct. The rest of the databits in the colorgram may then be used for a number of an alternative applications. This includes the provision of keys for encryption of files etc. or for generating One Time Passwords (OTPs).

Figure 8:
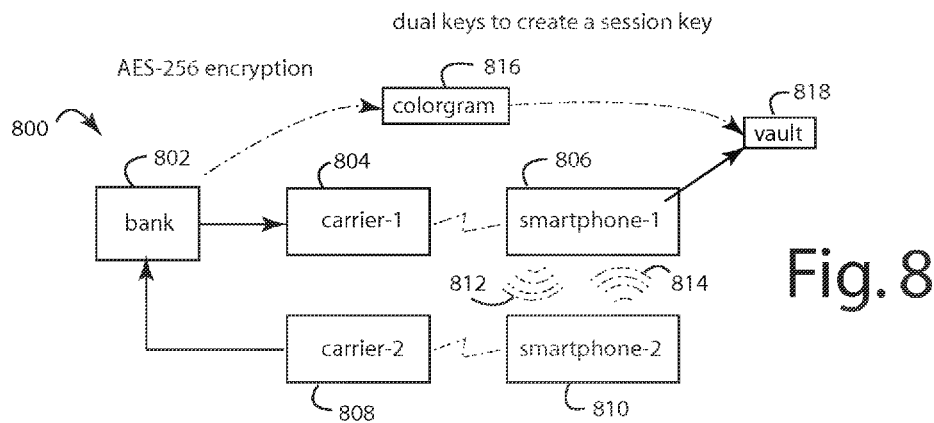
FIG. 8 is a functional block diagram of a peer-to-peer transaction system and an associated method in embodiments of the present invention.

A second group of embodiments of the present invention, starting with FIG. 8, provide higher levels of security for mobile devices used in consumer-merchant and peer-to-peer financial transactions. Colorgram technology is combined with customized and selected data independently pushed to the participating mobile devices from a remote server after encryption with such common algorithms as AES-256 bit encryption. Such data can be embedded in the colorgrams to dynamically provide user authentication codes, merchant coupons, product advertisements, and/or browser links for product information and ordering.

FIG. 1 represents a highly specialized application of an encoded colorgram system, herein referred to by the general reference numeral 100. Such example is intended to demonstrate a practical and important use of the colorgram technology claimed herein. A personal trusted device (PTD) such as a smartphone or feature phone 102 is routinely carried by a user 103 along with a visual key or colorgram 104 in the form of a decal on a keychain, payment card, or other personal item. A camera included in the smartphone 102 is able to image the colorgram 104 at will and a microphone can collect an audio sample of a user's voice 106.

Multi-factor authentication is provided by a what-you-have security factor 108 represented, e.g., by a SIM card in the smartphone 102, a what-you-know security factor 110 represented by the user's possession of colorgram 104, another what-you-know security factor 112 represented by a user's entry of a PIN, and a who-you-are security factor 114 represented by the user's voice 106. Some or all of these security factors can be collected in real-time and concatenated together to form a very long user authentication sequence.

The colorgram 104 may include various color marks and subfields 116 to assist in the image orienting, self-calibration, and interpretation of the color encoding carried by colorgram 104. Colorgram 104 includes visually encoded data in the form of colored cells from a predetermined palette of colors and arranged in a grid, radial pattern, matrix, or other pattern. The colored cells can be circles, squares, rectangles, ovals, or any other shape, and embodied within geometrical shapes such as circles, squares, and even animal templates.

When four colors are available for use, all four of those colors can be used in the color calibration sub-field 116. However, each calibration sub-field cell is only useful as a color reference cell, not a data cell. Data cells can be used for user authentication and identification processes. So, in a four-color matrix, the calibration sub-field can be limited to three of those colors. It is obvious that any of the three colors will be easily recognized, if a color in a cell is not recognized the cell must be the fourth color. The advantage is that a sub-field cell is thereby made available for use as a data value cell.

In one embodiment, a self-calibration subfield 116 includes a color cell from each of the palette of colors. If there are eight colors used in the palette, then there will be eight colored cells in the self-calibration subfield 116. These are arranged in a matrix in a standard way such that they can easily be recognized together as a self-calibration subfield 116 by an application software (app) 118 installed on the smartphone 102. Not all representative cell colors need be included in the self-calibration subfield, as they can be differentially computed from a known palette, or simply by omission from the subfield.

Environmental and product variations in the image capture of colorgram 104 with smartphone 102 can often produce large uncertainties in determining which colors in the palette of colors each colored cell in colorgram 104 represents. Application software 118 includes subroutines that register each of the color cells imaged in self-calibration subfield 116 as the possible choices, and each color cell from the colorgram 104 is compared to test which standard color is the closest match. The decisions can be reached quickly and with very few reading errors.

The map locations of color cells can provide another dimension to the data value, e.g., in addition to the base value assigned to the specific color. Such location mapping can be set by the server to suit its encryption methods, and they may be sequentially assigned or randomly assigned location data readings. But, if the data is structured, such as in a URL, then it would be fairly easy to sort out the read order by unjumbling, as in solving an anagram of an English word. If the data were unstructured, such encryption is at best a onetime pad. An attacker could submit multiple input colorgrams to the algorithm which it will then repeatedly decode, therefore reusing the one time pad to decrypt more than one message, and enabling the attacker to deduce the read order.

A determination of which color from the palette of colors is represented by each color cell in colorgram 104 can be ascertained by mapping all the colors visualized and finding the correlations amongst them.

User 103 and smartphone 102 may authenticate themselves through a wireless network 120 to a webserver 122. A multi-factor authenticator 124 can pre-issue credentials like colorgram 104 in the form of small stickers or decals printed on a printer or other output peripheral 126. When the concatenated user authentication code is returned through webserver 122, that portion representing the what-you-have security factor 110 can be verified by multi-factor authenticator 124. A database 128 maintains a list of accounts and one-time-passcodes (OTP) 130 authorized by a financial institution 132, for example. A short-term supply of time or event stamped OTP's 134 is stored within smartphone 102 for use later when the network 120 is inaccessible, changed according to secret algorithm encryption keys The colorgrams can be used in offline mode to authenticate users to mobile devices. The mobile devices can then proceed to open Vaults, eWallets, etc. The colorgram provides enough data bits to contain keys of size equal the security level inherent in the mobile device crypto-libraries, therefore maintaining the device security level.

FIG. 2 represents a colorgram embodiment of the present invention, and is referred to herein by the general reference numeral 200. Colorgram 200 includes, in this example, a rectangular 9×6 matrix data field 202 decorated with a predetermined physical pattern of colored cells d1-d54. The variety of colors is limited to a finite set of colors in discrete steps. The whole is arranged and configured so that a digital camera in the PTD can image of all the colored cells d1-d54 at once. The choice of colors of each colored cell d1-d54 and its location within the predetermined physical pattern of matrix data field 202 is capable of encoding data.

A subfield 204 of colored cells is chosen to serve as a calibration subfield, and is disposed in a standardized place in the data field and a standardized choice of colors of each colored cell from the finite set of colors in discrete steps and a standardized location within the subfield. In this example, red-green-blue-cyan-magenta-yellow (R, G, B, C, M, and Y). All the other color cells d1-d54 which encode data must be one of these colors, and a processor using a camera to image matrix data field 202 can rely on this rule to speed recognition of the data encoded in colorgram 200.

The example of FIG. 2 uses six standard colors. If eight colors were the standard, each colored cell d1-d54 could be used to represent a 3-bit binary, 0-7 decimal. More colors and larger matrix sizes can be used to encode more data, but the limits are reached by the camera's abilities to resolve the cells and their colors within a larger matrix, or smaller matrix with smaller individual cells.

The calibration subfield 204 serves as a means to orient and synchronize the encoded data present in matrix data field 202. Such data is visually encoded into the data field as (1) a particular step in one of the color spots in the finite set, and (2) in respective locations within the matrix data field 202. Each place in the matrix data field 202 can carry a different weight, meaning, or act as a data definition. Reading the encoded data can begin with colored cell d1 and end with d54, for example.

It is entirely possible to change the sequence in the way the cells are read, starting, for example, at d54, ending with d1, or transposing rows and columns, or reading diagonally, to name just a few of the algorithms that may be used. In fact, any permutation of the cells will do, and such permutations can serve as a key stored on the corresponding PTD. The key in the colorgram is useless to anybody without that particular PTD. Alternatively, a separate and independent key placed in the phone can be used with the key from the colorgram.

FIG. 3 shows a practical application of a colorgram. A key fob 300 has a colorgram 302 that has been applied to it. The intention is that a user would routinely have such a key fob 300 on their person or handy within easy reach.

FIG. 4 represents a similar application of a colorgram. A key ring 400 has several "keys" 402 and 404 that respectively have different colorgrams 406 and 408 applied to them. A user would routinely have such a key ring 400 with conventional house and car keys on their person or handy within easy reach. Having separate, different colorgrams 406 and 408 would be advantageous when accessing different kinds of security devices, e.g., home and business.

FIG. 5 represents a computer subroutine 500 that may be included, e.g., in downloaded application software 118 to read and interpret colorgrams and to extract the encoded data. A step 502 collects a colorgram image through an available camera. The image collected must be freshly captured by the camera data stream and not from a stored image, nor can it be retained after processing.

A step 504 searches the color cells in the colorgram image for a group of self-calibrating color subfields. In some instances, it may be preferable to complete rotational orientation step 506 first.

It may be useful to employ more than one kind of self-calibrating color subfield group. The particular group in use can be used to signal a general class or purpose of the colorgram in which it is embedded, e.g., banking versus social networking. Or the group can signal data field matrix sizes. The data also can signal this.

A step 506 uses the recognition of a rotational alignment cell as a means to orient the rest of the colored cells and data in the colorgram.

A step 508 compares each colored cell imaged by the camera for the colorgram against the discrete colors provided by the self-calibrating color subfield group. The self-calibrating color subfield group is the complete set of all the possible color steps that can exist in the colorgram, so every colored cell in the colorgram must match one of those steps. Any discrepancies in the captured images will be produced by gradients across the image, due to variations in lighting, perspective, printing medias, display technologies, white-balance, imager, and other random and uncontrollable variations. Every image pixel can be represented numerically in terms of brightness, color saturation, and color hue. Step 508 matches each colored cell to the one cell in the self-calibrating color subfield group that has the smallest deviation.

A step 510 is then able to recover the raw data that was visually encoded as colors in the colorgram. If the raw data itself was encrypted, e.g., a URL for a website, a passcode, or straight data, a step 512 decrypts this data.

Figure 6:
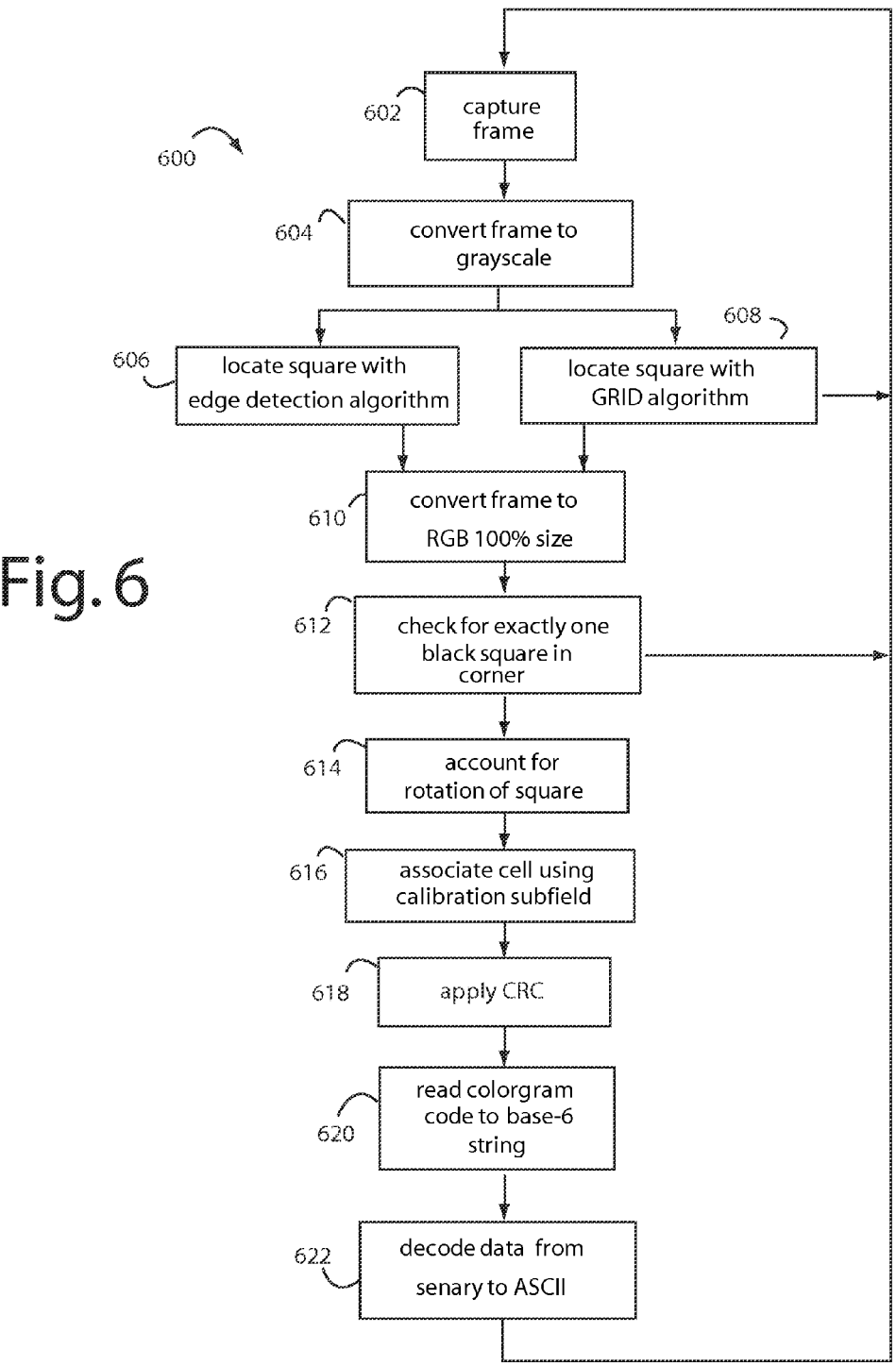
FIG. 6 is a flowchart diagram of a colorgram recognition process embodiment of the present invention.

FIG. 6 represents an Automated Shutter Colorgram Capture (ASCC) colorgram recognition process embodiment of the present invention, and is referred to herein by the general reference numeral 600. A step 602 uses a camera to capture a video frame. A step 604 converts the video frame to grayscale. A step 606 uses, for example, an edge detection algorithm to find the location of the colorgram within the video frame. Alternatively, a step 608 uses a color alignment. If neither finds the colorgram, step 602 is used again to capture a better video frame.

A step 610 converts the video frame into a full size color image. A step 612 checks to see if a unique feature like a single black square in only one corner can be identified. Some embodiments may not employ this method.

A step 614 accounts for any apparent rotation of the colorgram using a black, or other unique color corner square as an index. Alternatively, image orientation may be identified within the server-encrypted data pushed to the mobile device. A step 616 calibrates the colors in the colorgram using the calibration subfield cells as a reference. A step 618 applies an cyclic redundancy check (CRC) to determine read accuracy. A step 620 reads the colorgram as a senary (base-6) number string. A step 622 decodes the base-6 senary string into an ASCII text string.

Figure 7:
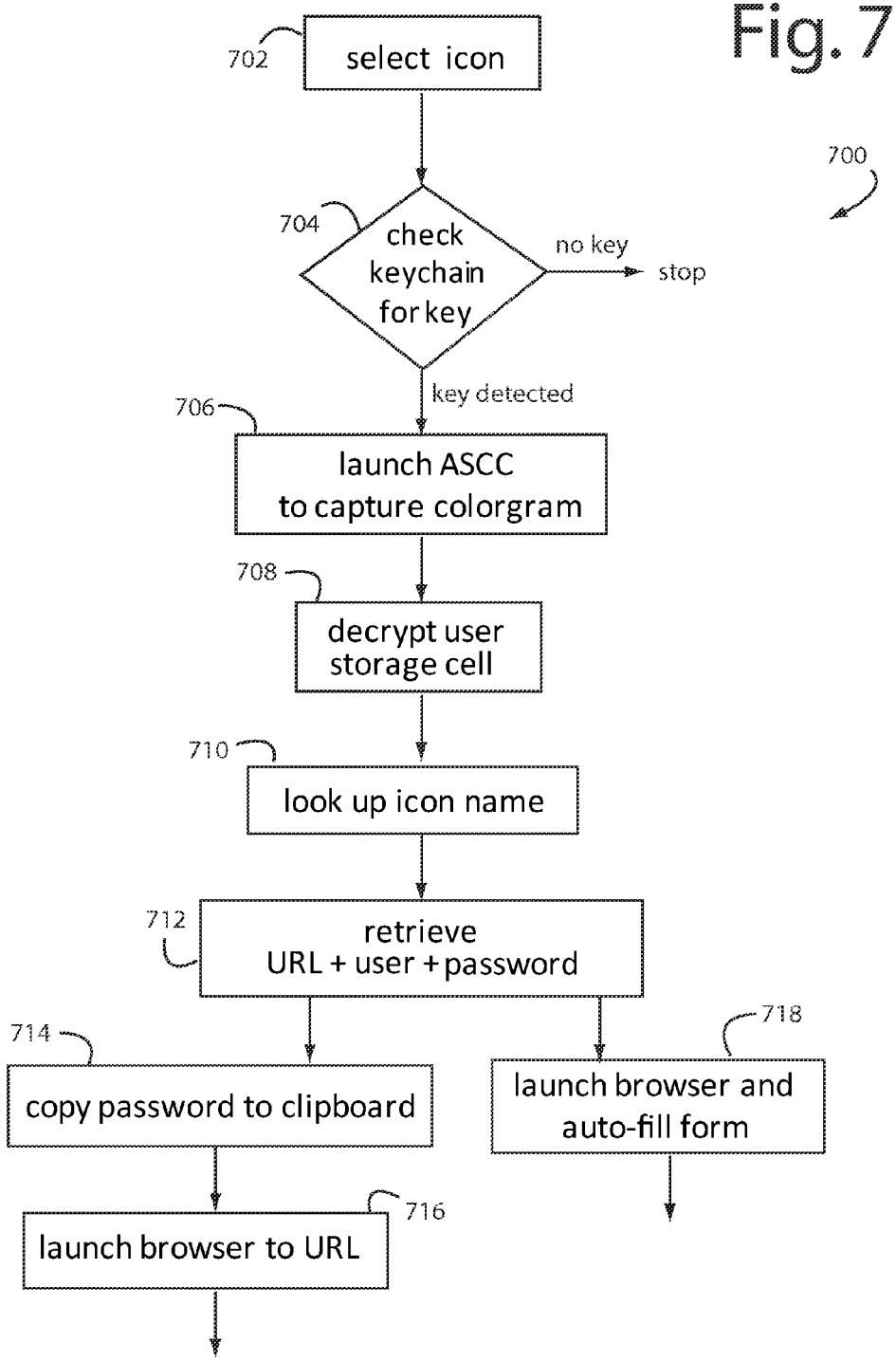
FIG. 7 is a flowchart diagram of a top level program to run on a smartphone with colorgrams to authenticate users to application programs.

A program 700 represented in FIG. 7 runs, for example, at top level in smartphone 102 (FIG. 1). Each secure application on the smartphone is represented on a display screen by a corresponding icon. In step 702, the user selects the application icon that they want to launch. A decision 704 decides if the keychain, like the one in FIG. 3, needs to be captured to collect its colorgram for one of the user authentication security factors. If so, a step 706 launches an ASCC subroutine like that of FIG. 6. A step 708 decrypts the user storage cell. A step 710 looks up the relative icon data encoded in the colorgram. A step 712 fetches the corresponding URL and adds in the user ID and the website passcode. Such passcode may be a strong random passcode automatically generated on behalf of the user when enrolling the particular website to use the security gateway. A step 714 copies the relevant PIN to the clipboard and a step 716 launches the browser to the URL. Otherwise, a step 718 launches the browser to the URL and an auto-fill log-in form.

Printed colorgrams can be produced with special inks that fade or color-shift over time or after each exposure to a laser scanning device. The color-shifts are predictable and a server can run additional security checks for user authentication by calculating the expected color-shifts to the currently received images. That way simple copies of colorgrams will rapidly stale and not be useful. This technology is widely practiced in other embodiments such as holograms and are generally known as Physical Uncloneable Functions (PUF).

Starting with FIG. 8, the second group of embodiments of the present invention provide higher levels of security for mobile devices used in consumer-merchant and peer-to-peer financial transactions. Colorgram technology described in connection with FIGS. 1-7 is dynamically combined with customized and selected data independently pushed to the participating mobile devices from a remote server. Such data is embedded in various colorgrams to provide real-time user authentication codes, merchant coupons, product advertisements, and/or browser links for product information and ordering. Such application of data can bring a much greater user experience and value than simple authentication.

Higher levels of security are made possible in embodiments of the present invention by both authenticating the user to the PTD and by the other user or merchant identifying the first user.

Key differences over conventional devices include the use of all the available colors on a mobile device. Conventional devices use only red, green, and blue dots in a heavy black border for edge detection, and the base colors are factory calibrated on most displays. Colorgram embodiments of the present invention use a color-calibration sub-field to compensate and interpolate the colors in mobile to mobile (m2m) applications. Such are highly scalable, because all of the available space is used for data encoding. Values are assigned to both the color and factorial to the color cell location. Defined template overlays can redefine the start through stop reading sequence, such as left to right and top to down, or any randomized variation. These templates can be applied in multiples to read the data in multiple pattern distribution, possibly yielding greater encoded data than a single monolayer template. Printed or displayed images of the colorgrams are used for authentication to mobile devices. Conventional devices rely on servers pushing images to desktop computers in realtime. Colorgram embodiments of the present invention provide OTP and passcode data and further provide URL, passcodes, and advertising URL's. Colorgrams can also include a number of digital switches to use in sub-applications, e.g., for a persona build.

FIG. 8 represents an online transaction system 800 in which two users can engage in a face-to-face financial transaction. For example, the users are a buyer and a seller. A bank 802 carries individual accounts for the users involved and each can log in independently. Any means of electronic communication can be employed, but here in this example a first user is serviced by a mobile cellular carrier-1 804 and carries a smartphone-1 806. A second user is serviced by a mobile cellular carrier-2 808 and carries a smartphone-2 810. The smartphones are proximate to one another during a transaction between them, and each can receive the other's transmissions 812 and 814, e.g., using Bluetooth. In one aspect, bank 802 can push an AES-256 bit encrypted colorgram 816 to an encrypted vault 818 included in smartphone-1 806. This then is displayed to smartphone-2 810 for imaging with a built-in camera.

Another way would be to use a display flashing method to transmit serial data optically to the other phone, which reads it with its camera in movie mode, capturing a video clip of the sequence. It may be possible to capture the sequence in real time reading the raw data as if it were a web cam, which the iPhone-4 has on the forward facing camera.

Smartphone-2 810 returns the image of the colorgram it obtained to bank 802 through its carrier-2 808 to confirm the transaction and to authenticate the users. The encrypted data may also include merchant loyalty coupons, advertisements, or other promotional data that may be useful and associated with the product purchased, the amount transacted, the merchant offerings, the location of the purchase, and other targeted or directed promotions.

FIG. 8 therefore gives form to a method embodiment of the present invention. A mobile-to-mobile transaction method starts by logging at least two mobile smartphones 806 and 810 onto the same transaction server (bank 802) using prearranged individual enrollments of corresponding users. A dynamic digital image of a colorgram 816 is built at the transaction server. User authentication codes, merchant coupons, product advertisements, and browser uniform resource locator (URL) links for product information and ordering can be embedded and encrypted in each colorgram 816. The dynamic digital image of the colorgram is sent from the transaction server to a first one of the mobile smartphones 806 for its display to a co-located second one of the mobile smartphones 810. Any authentication of transactions between users of the first and second mobile smartphones 806 and 810 is based-in-part on a calculated expectation of what the second one of the mobile smartphones should return when it provides its own digital image of the colorgram displayed by the first one of the mobile smartphones.

The typical colorgram 816 used in embodiments of the present invention can encode three hundred bits of information. Many financial institutions require 112-bits minimum for keys and 14-20 bits for security passcodes and PINs. Encoding a PIN or key still leaves well over two hundred bits of information in a typical colorgram 816 that can be devoted to real-time pushing merchant coupons, product advertisements, file locations, bookmarks, passcodes, crypto-keys, one-time-passcode (OTP) seeds and initialization vectors (IV), recovery process, user-preferences, and browser uniform resource locator (URL) links for product information and ordering. These can be automatically selected according to various criteria, e.g., the users, merchants, locations, and/or products involved in the present transaction.

Figure 14:
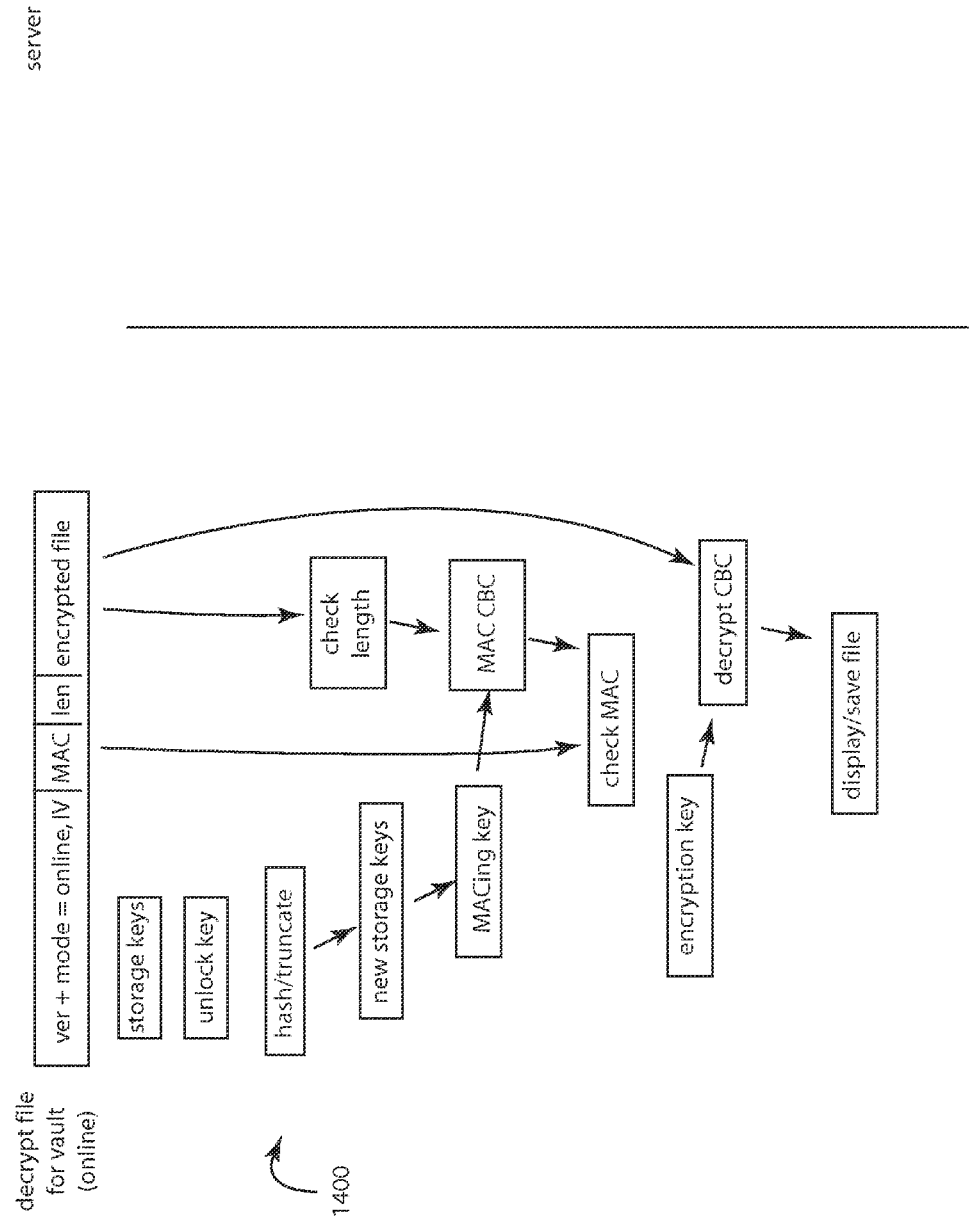
Figure 15:
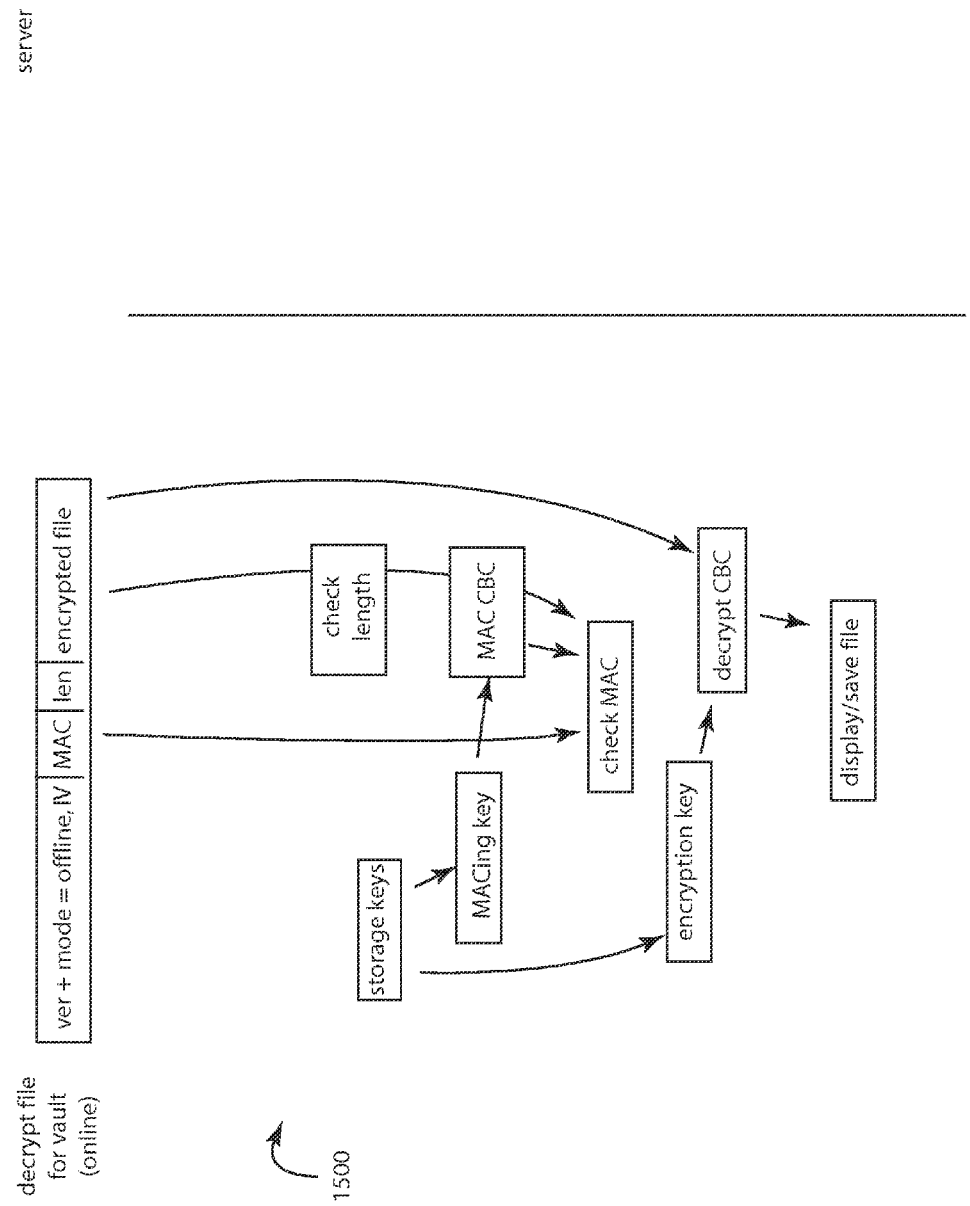
Figure 16:
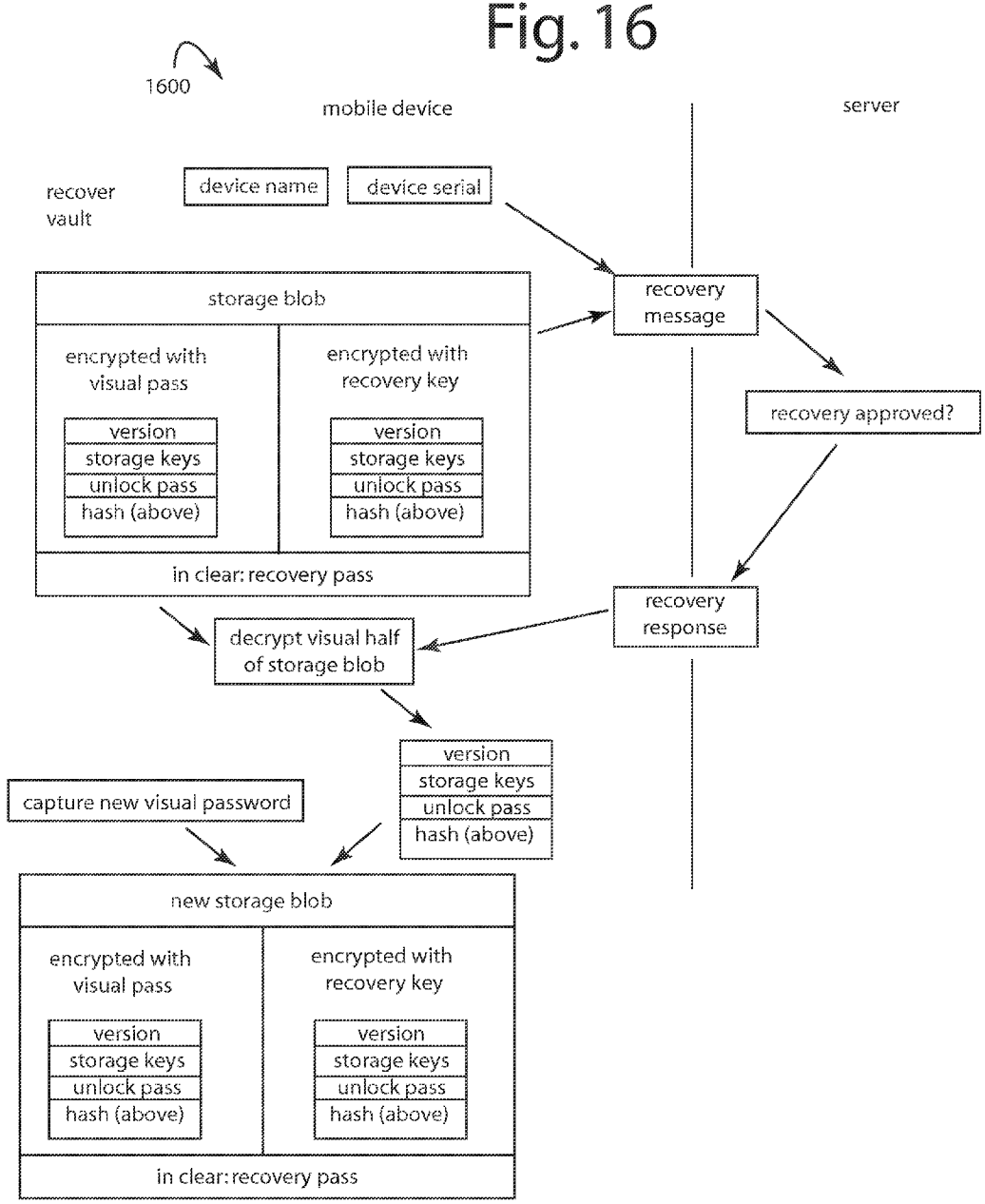

FIGS. 9-16 represent data flows that occur in system 800 for vault initialization (FIG. 9), opening vault 818 when offline (FIG. 10), opening vault 818 when online (FIG. 11), encrypting files for vault 818 when offline (FIG. 12), encrypting files for vault 818 when online (FIG. 13), decrypting files from vault 818 when offline (FIG. 14), decrypting files from vault 818 when online (FIG. 15), and recovering a lost or damaged vault 818 (FIG. 16).

Figure 9:
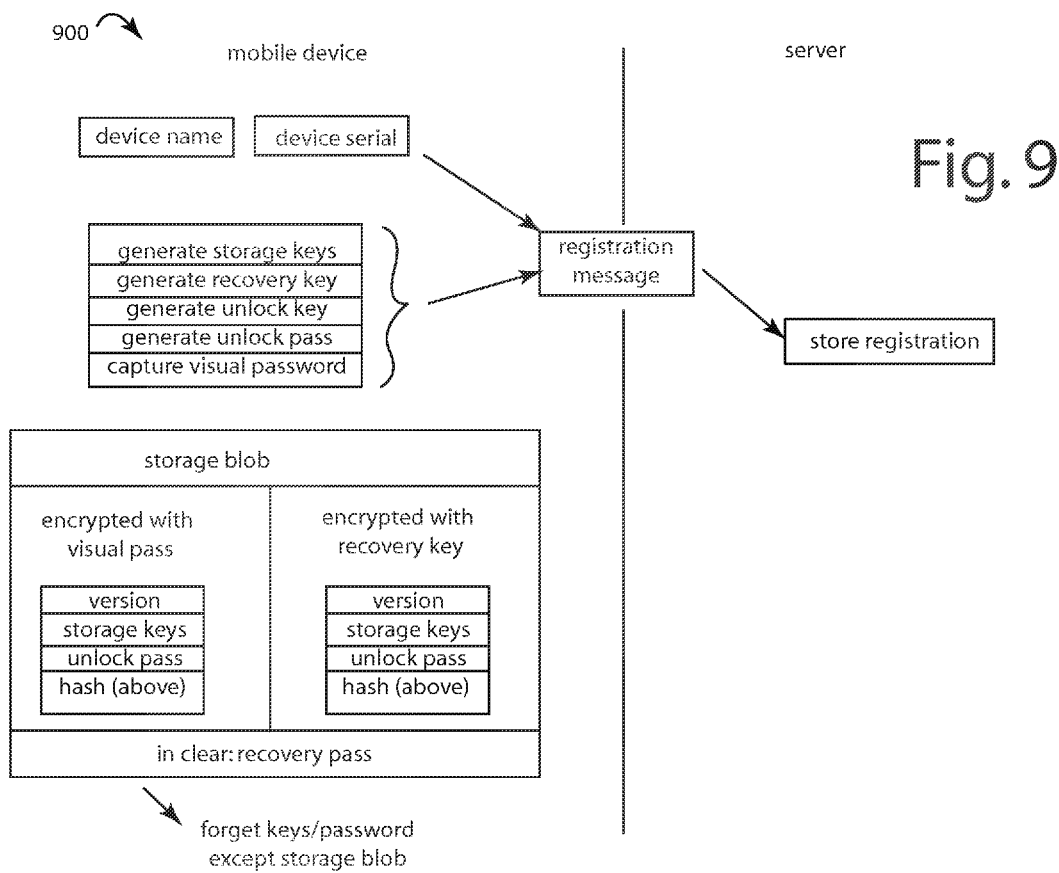
FIGS. 9-16 represent various data flows that occur in the system of FIG. 8.

FIG. 9 shows a method 900 for initializing the vault of FIG. 8. The device name and serial number of a mobile device are sent to a server in a registration message together with keys and passcodes generated by an application program.

Figure 10:
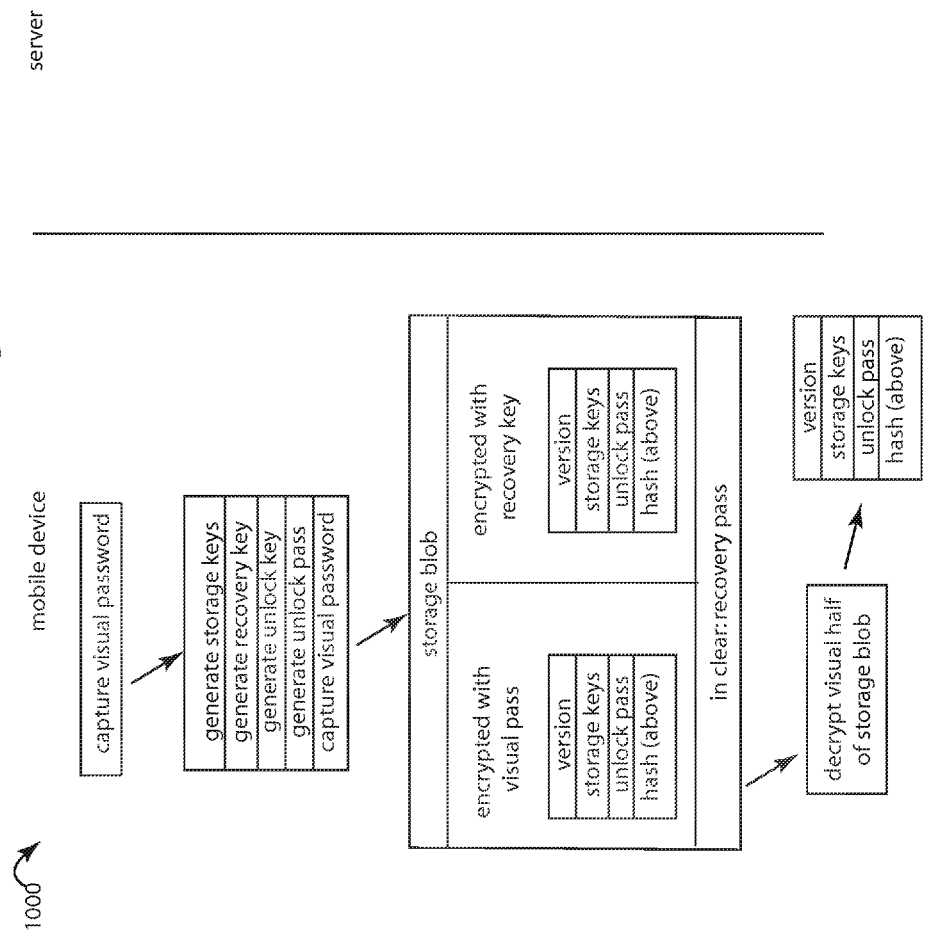

FIG. 10 shows a method 1000 for opening the vault of FIG. 8 when offline. A visual passcode is captured and used to generate storage, recovery, and unlock keys. The server need not be consulted, or it may simply not be available.

Figure 11:
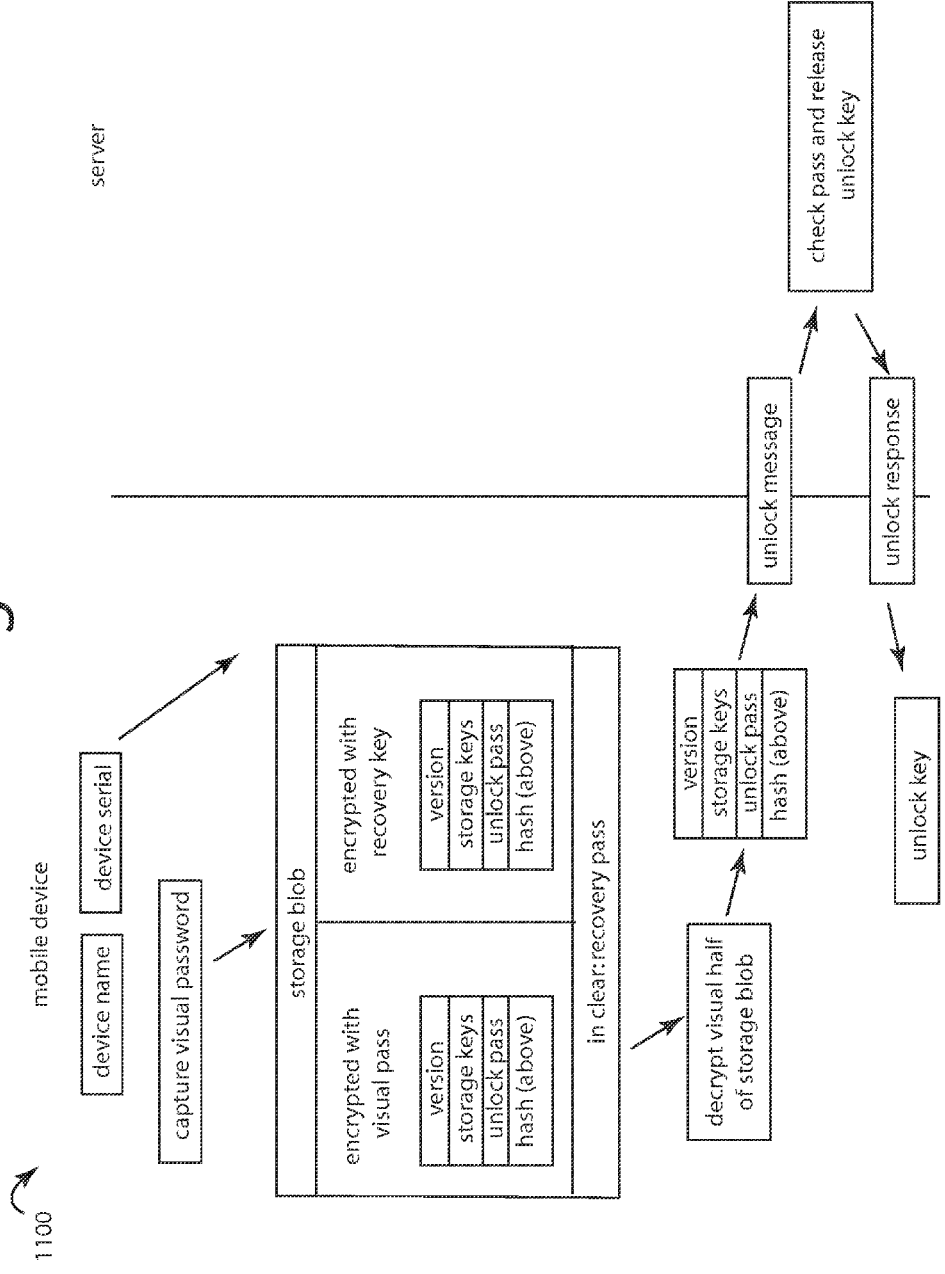

FIG. 11 shows a method 1100 for opening the vault of FIG. 8 when online. An unlock message is transmitted to the server from information derived from a hash of the version, storage key, and unlock passcode. The server checks the passcode and releases the unlock key in an unlock response message.

Figure 12:
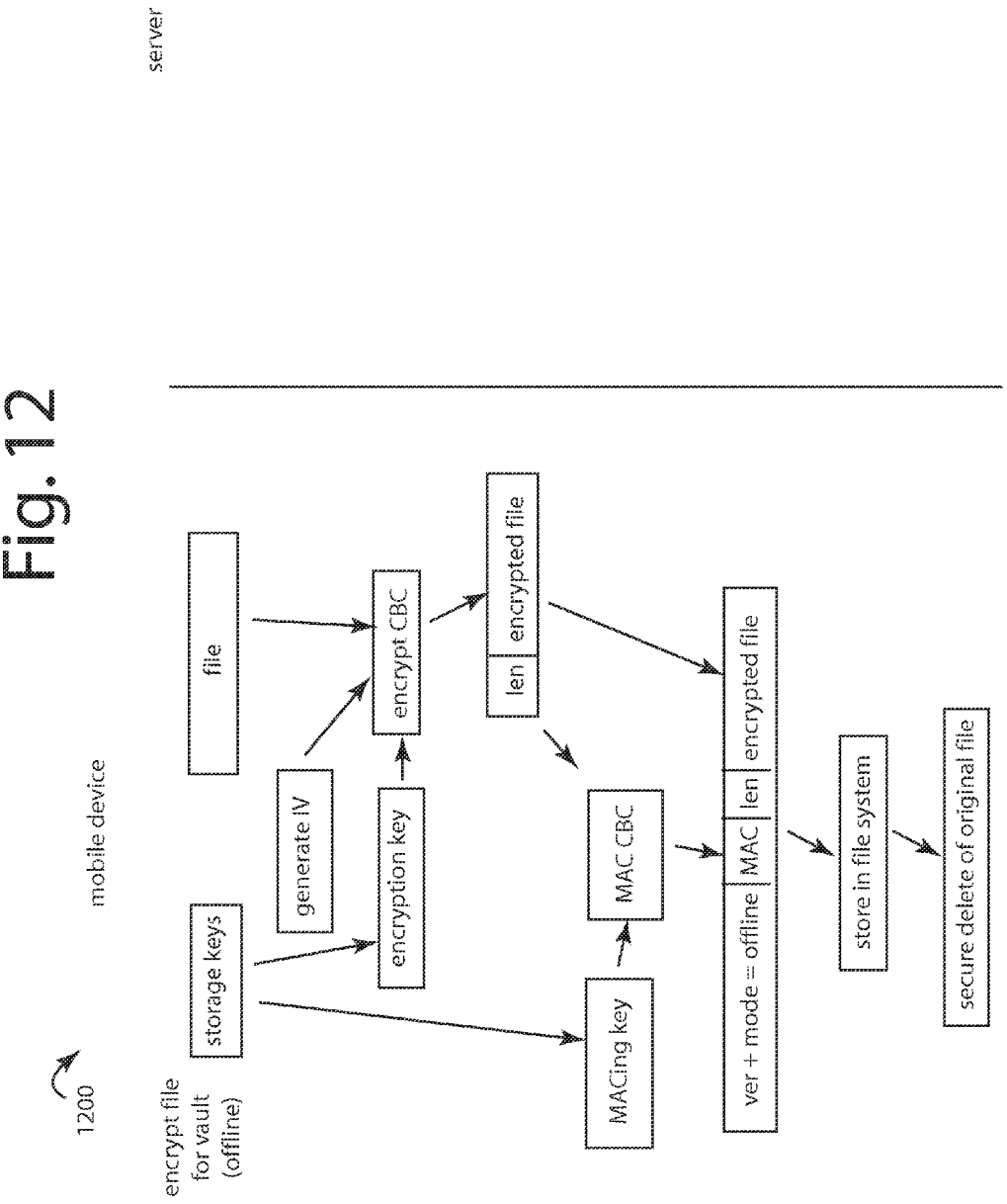

FIG. 12 shows a method 1200 for encrypting files for the vault of FIG. 8 when offline. The server need not be consulted, or it may simply not be available.

Figure 13:
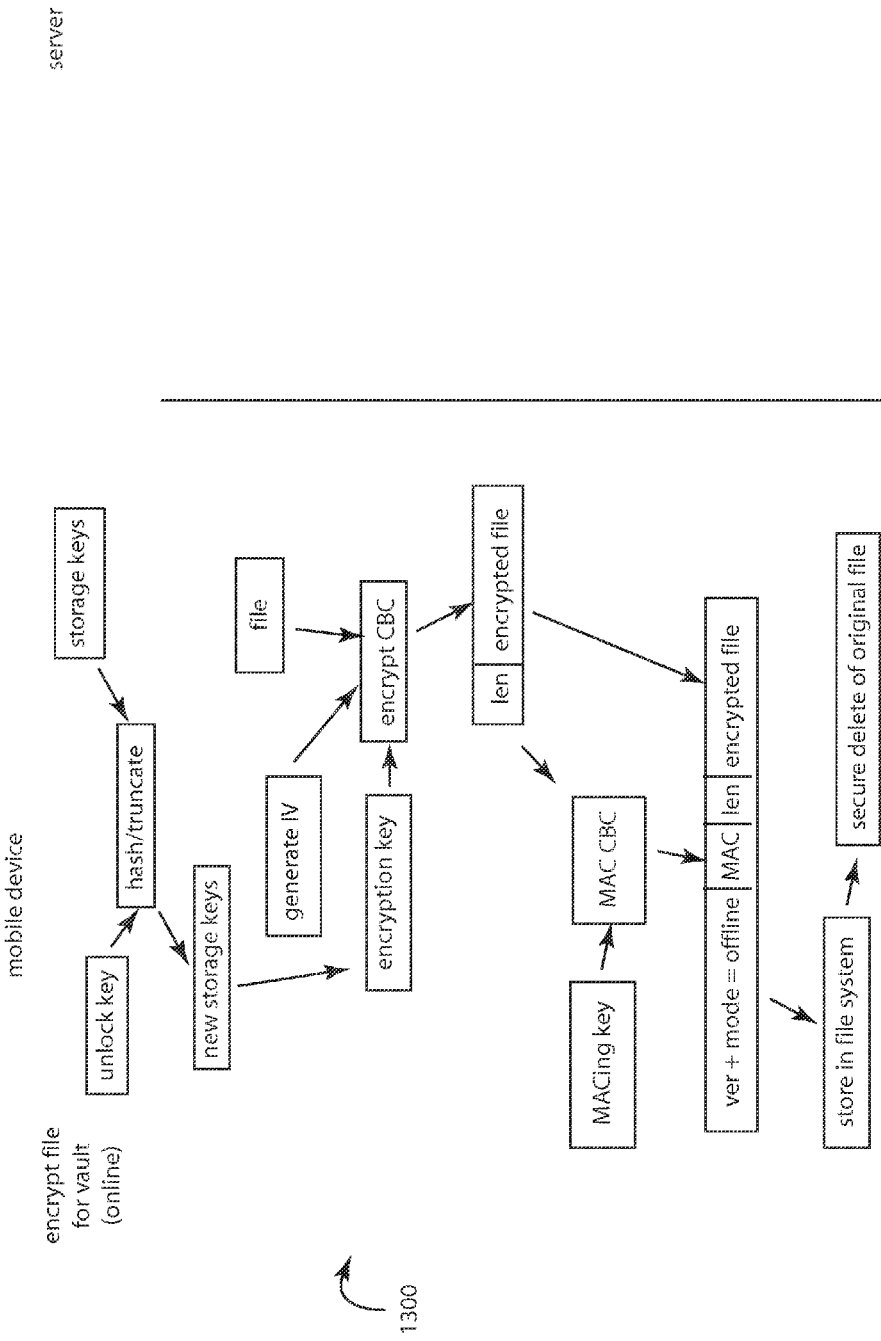

FIG. 13 shows a method 1300 for encrypting files for the vault of FIG. 8 when online.

FIG. 14 shows a method 1400 for decrypting files from the vault of FIG. 8 when offline.

FIG. 15 shows a method 1500 for decrypting files from the vault of FIG. 8 when online.

FIG. 16 shows a method 1600 for recovering a lost or damaged vault of FIG. 8. A recovery request message is sent to the server using a storage cell and the device name and serial. The server approves the recovery and returns a recovery response. The information returned is combined to decrypt the visual half of the storage cell. This generates a new version, storage key, and unlock passcode.

FIGS. 17A and 17B represent an electronic transaction security method 1700 for authenticating transfers between independent users each equipped with a personal trusted device. A network transaction server 1702 is connected to communicate with a variety of communications networks like cellular carrier-1 1704 and cellular carrier-2 1706. These, in turn are able to independently communicate with mobile electronic devices such as smartphone-1 1708 and smartphone-2 1710. The basic hardware and functioning of the network server, carriers, and smartphones is conventional. Method 1700 is implemented with downloadable software applications (app) installed on the smartphones, e.g., Android or iPhone apps.

Referring now to FIG. 17A, method 1700 enrolls subscribers, accountholders, and users in a way that starts and proceeds conventionally. An enrollment process 1712 directs the enrolling user to build a graphical persona 1714 on their display that resembles them using a composite art drawing program. A persona descriptor library 1716 and 1718 allow simple choices of gender, age, race, hair, eyes, nose, chin, ears, and other limited categories. The choices within each category are standardized into 2-8 choices, for example.

As the enrolling user makes their choices, the graphical persona build 1714 develops on their display screen and can be modified, edited, and corrected to suit their wishes. Once finished, the choices, and not the graphical persona itself are uploaded to the server 1702 to become part of the user's profile. The graphical persona building is expected to be fun for the user, unlike typical enrollments that can be tedious and tiresome.

Traditional Composite Art is an artistic technique used to create a drawing from individually described parts into a single image. For example in Law Enforcement, sketch artists are employed to draw a likeness of a suspect from a witness' observation. Facial compositing software and forensic graphics techniques would be useful in the building of graphical persona 1714. For example, FACES 4.0 composite software marketed by IQ Biometrix, Inc. (Kingwood, Tex.); and FACETTE Face Design System marketed by IDENTI.NET Internet+Software Services GmbH (Hard, Austria). The persona may be static or active on the display after authentication, and may even speak words the user has selected such as "thank you". Simple binary data switches in the colorgram would identify the "build characteristics" and the resident application on the PTD would build the persona.

Referring now to FIG. 17B, method 1700 is ready to support in-field mobile transactions between previously enrolled subscribers, accountholders, and users. For example, the payment of an agreed amount of money in a retail purchase of goods at a store. The two users involved must be present at the same location and logged on to the server 1702, thus the vast majority of fraudsters will be excluded. Both users begin by logging-in with server 1702 using their respective smartphones 1708 and 1710.

Embodiments of the present invention are useful for file transfers and local vault storage, not only financial applications. The inter-device and intra-device security technology described herein can be included on the front-ends of many applications.

When the first user with smartphone-1 1708 requests a transaction and payment authorization, server 1702 fetches corresponding persona descriptors 1720 and embeds them in an encrypted colorgram 1722. Such persona descriptors are represented as color cell data 1724. Smartphone-1 1708 decrypts and interprets the colorgram 1722 and presents it on a visual display 1726 with color cells 1728.

The user of smartphone-2 1710 receives payment and verification by imaging 1730 visual display 1726 and color cells 1728 with its camera. Smartphone-2 1710 presents the first user's graphical persona on display 1732 using the descriptors to index a library 1734. If the graphical persona resembles the first user, the second user sends an "OK" message 1736 to the server 1702.

In general, process embodiments of the present invention include pushing an encrypted video image from a transaction server over a network to a first personal trusted device. Then, a decryption of the video image is displayed on the first personal trusted device. A video image of that displayed on said first personal trusted device is captured with a camera of a second personal trusted device. An encryption of the image captured from the second personal trusted device is uploaded to the transaction server. An associated transaction between independent users respectively equipped with the first and second personal trusted devices is authenticated based on a comparison of the encrypted video image that was pushed to the first personal trusted device and what was uploaded from the second personal trusted device.

The pushing of the encrypted video image can include at least one coupon, advertising, and/or uniform resource locator (URL) link to the personal trusted device.

Other embodiments of the present invention can operate with even higher levels of security by collecting a type of biometric who-you-are security factor in addition to the what-you-have (smartphone) and what-you-know (passcode) security factors. This is what is represented in FIGS. 17A and 17B. In general, such embodiments include software and application programs to build a graphical persona or upload an image for identification.

If a smartphone has a public key pair installed, then there is inherent protection against man-in-the-browser, man-in-the-middle, Trojan horses attacks, and similar malware. One option is to encrypt the private key and store it encrypted under a colorgram key. The key for decrypting the private key is loaded into the smartphone from the colorgram as described herein, and the private key is recovered for a subsequent transaction, such as a signature generation or the decryption of received data. Anyone can then encrypt a message, file, or other transaction component with the corresponding public key and send it to the PTD of the owner of the private key and only the PTD can decrypt it with the corresponding said private key. Likewise, the user may generate a digital signature on a file or a financial transaction with said private key and forward it to another PTD or bank or whatever.

An alternative is to use a bit sequence from a colorgram as a seed, rather than a key, to initiate the generation of the private key on the phone every time a signature needs to be generated or a file needs to be decrypted. Additionally, the PTD may provide and additional seed stored permanently on the PTD The colorgram is then of no use to others because a separate seed is stored on the phone. Both are needed for key generation. Generating a public key pair from a seed is conventional, e.g., see *Handbook of Applied Cryptography* by Menezes, van Oorschot and Vanstone.

So stealing a smartphone would be useless, because the secret is not stored on the phone, not even in encrypted form. Conversely, stealing a colorgram is not enough either, as the seed in the colorgram cannot be used alone to generate the key.

A private key is nevertheless available on the smartphone to generate a digital signature. The first time it's generated, the public key may be registered with a Certification Authority, and a certificate may be issued according to existing standards such as X.509, EMV, etc.

To protect against future attacks on signature generation, more elaborate schemes may be applied, where the message to be signed is confirmed through a separate channel, such as a work station or another phone using, e.g., the technology described in United States patent application, US 2008/0307515 A1.

Colorgrams that change over time are a type of physical unclonable function (PUF). And so other manifestations of a PUF embodied in a token can be used instead. In general, a PUF is a physical embodiment that is easy to evaluate but hard to predict. But to be practical, PUF's must be inexpensive to manufacture but practically impossible to duplicate, even with the manufacturing process that produced the original. It is the hardware equivalent of a one-way function.

PUF's implement challenge-response authentication rather than embodying a single cryptographic key. PUF's react in an unpredictable ways to inputs because the physical microstructure of the device causes a complex interaction to stimulus. The exact microstructure depends on unpredictable physical factors introduced during manufacture. The stimulus applied is the challenge, and the reaction of the PUF to it is its response.

A specific challenge and its corresponding response together form a challenge-response pair (CRP). The device's identity is established by the microstructure's properties. Such structure is not fully revealed by the challenge-response mechanism, and so is resistant to spoofing attacks. PUF's can be implemented with inexpensive hardware that is proportional to the number of challenge and response bits.

A PUF is unclonable because each device has a unique and unpredictable way of mapping challenges to responses. Using the same process to make a similar device is not enough, because the manufacturing process cannot be exactly controlled. Each response is created by a complex interaction of the challenge with several random components. So, the CRP's are highly unpredictable.

Embodiments of the present invention comprise three basic elements: authentication, identification, and system functions. In authentication, the user is authenticated to the PTD by a colorgram with the key, and encrypted data that integrates user data and cryptographically generated passcodes for user URL sites is pushed by a server. Alternatively, PKI is used in an asymmetrical key system in which the colorgram is public in that it is data encrypted by a public key. Any loss of the colorgram, or the PTD, would not compromise its encrypted data, as the colorgram containing the data needed to reproduce the private key is necessary to access as well. Trojan Horses and most other malware could not compromise such encrypted data. But, PKI based systems require a lot of processing power from the PTD that may not be available in commercial devices for a few more years. Shifting colorgrams, e.g., chemical dye diffusions having a known reaction basis, or a PUF, are also included in some embodiments.

Most mobile transactions are debit or checking account related, not credit card related. So more of the risk of a fraudulent transaction is carried by the merchant. The use of personas in identification is a more pragmatic alternative to relying on merchants to ask to see a drivers license, passport, or other ID. It has value for the merchant in identifying the user in front of them, and not merely the authenticating of a possible user to a possible PTD. It can also be a "fun" consumer experience, and recognizes most consumers will not upload real photos of themselves for many reasons. So, building a persona with 5-10 identification points, e.g., hair color/style, eyes color and facial placement, skin color, facial geometry, male or female, facial hair, and other points, can be implemented with simple check boxes. Such selections can be used in a sub-routine to immediately copy the persona onto the merchants PTD.

Personas can be static, dynamic, animated with laughter, speaking words, or translate into something else after a few seconds. Alternatively, servers can accept uploaded photos and approximate personas from. The consumer experience should lead to early adoption, like ring-tones. The "facetones" may become a big follow-on business by independent developers. The user experience needs to be more fun than a simple swipe, or push button. The consumer should be emotionally involved with their transaction process/system.

A system's architecture is needed to make everything work. Servers accept user data, e.g., URL and username and passcodes for their "secret" sites, financial sites identification that require an OTP, persona builds, and local device eWallet of Vaults that require a complex passcode, etc. The user data is added to server-generated data, e.g., OTP seeds/Initialization Vectors <IV>, for colorgram mapping, scatter plot in cell location and cell factorial integers, color primary values prior to any factorial math, auto-regeneration for passcode updates of user-defined sites on a user-defined temporal basis. The new colorgram keyed encrypted data strings are pushed directly to the phone using conventional protocols. The data is secured in the PTD's local secure data area, and the colorgram is printed, displayed on a device, stored on a device, or printed by a third party as a PUF and mailed to the user/consumer.

The server can recycle colorgrams by remapping them with the encrypted data string sequence sent to the phone, or the servers can generate an entirely new colorgram and associated mapping and encrypted data. Colorgrams can be printed, stored on any device with a display (iPod, etc.), or transmitted to only the other device during a transaction, or a request can be made via Internet http/SMS to transmit it to a third device. This allows an iPhone, for example, to display a colorgram. Such will work in a normal symmetrical key application, but an asymmetrical Public Key Infrastructure (PKI) method is preferable since the colorgram would be of no use to anyone else. Colorgrams can be "sequenced" by the phone stored encrypted code, so each transaction has a key extraction, and then a re-sequenced data string on the phone. The advantage is that stealing a phone code and its colorgram would render both useless, since the code would have sequenced to a new interpretation, based upon a stored algorithm, or a server-pushed seed for an existing algorithm. The encrypted code on the phone would be single-event evolving, and prior use would not be acceptable, as in a replay attack.

A transaction security process embodiment of the present invention includes authentication and identification parts for pushing an encrypted colorgram for user authentication and persona descriptors for user identification from a transaction server to a first personal trusted device. A decryption of the colorgram is displayed on the first personal trusted device. An image is captured by a second personal trusted device. An encryption of the image captured from the second personal trusted device is uploaded to the transaction server. The persona descriptors are used to build a composite rendering for identification of the first user to the second user. The second user clicks "OK" if they recognize the composite drawing as a reasonable persona of the first user.

In general, users set up new accounts by logging onto an Internet server and provide all the usual bits of information in a conventional interactive process. If a user is comfortable uploading a photo of themselves, they can do it. Otherwise, new users engage in a check-the-box procedure to build a composite-drawing persona. Each check box best describes such things as the user's gender, race, age, hair color and style, facial geometry, eye color, ears, etc. A persona build application, resident on the server, assembles composite-image datums that can be sent on demand later to the merchants for ID verification of particular users. An uploaded recent photo would be best, but few people will upload a photo because of personal security concerns. It may be that such persona building and use could spawn a new industry, much like ring-tones. People like to personalize their possessions.

Conventional facial compositing and other computer assisted face generation techniques include character generation for computer game art assets, personalized online "avatars", photo fitting for helping witnesses identify criminal suspects, and character generation for 3D animations, comics, movies, etc. Such is very distinct from facial biometrics.

Conventional facial compositing and computer assisted face generation techniques concentrate on producing good visual likenesses to real world persons and to create striking and memorable avatars and characters from a range of possibilities which allow viewers to emotionally engage or identify with characters.

Biometrics concentrates on the measurement of body characteristics, such as measuring the distance between eyes, height of ears, proportions of the face, etc., at a level of measurement detail far beyond what an ordinary person perceives when looking at another's face. Which biometric characteristics to use are chosen in particular to be easy to acquire, but difficult to willfully change by facial expression or plastic surgery.

Self-generated facial composites do not necessarily convey an accurate likeness of the subject. Composites created by moving sliders to adjust features or through a directed iterative walk through random mutations is unlikely to result in a closely matching avatar. One alternative would be to generate the facial composite from a recent photo. If there is enough detail in the parameterization, it can essentially become a domain specific compression algorithm for the person's face.

Allowing users to choose their own avatars is unlikely to result a good likeness that a third person would immediately recognize. Working from a photo would be akin to implementing an efficient compression algorithm for facial data.

Facial compositing and biometrics can help during mobile electronic commerce or during face-to-face mobile transactions. In a case where each users mobile phone has connectivity online to a central server at the point of transacting, the users wish to be certain that they are transferring money from one to the other and not to a third party. The users can use their secure link via the central server to share a transaction identifier which both can display on a screen. In the simplest form this can be just a number. The number could be displayed in decimal on the screen, or it could be rendered as a pattern, or into an object from a set of well distinguished objects. It could also be rendered as a face.

Simple avatars can serve to distinguish amongst people with the same names posting in the same social community. Facial compositing is a fun alternative for people who would rather not post an actual photo of themselves, or who would like to construct a deliberately different alternate persona. But such could not be used to prevent one user from impersonating another. An attacker can simply choose a similar name and pick the same composited avatar, or just rip the image used straight off the site. Avatars have a role to play in preventing accidental confusion between parties, but do not provide much security.

A "secret face" can be constructed a photo or a composite of a person's real face that is unknown to attackers. A security protocol is needed in which the recipient of the transaction sends their face to the person about to make the payment in such a way that an attacker would not know which face to send at the time of receipt. But such an attacker would still be able to do a relay or masquerading attack. Facial images are trivial to copy.

Facial biometrics can be used in a mobile context to ensure that the person in front of a camera or sensor is really who they claim to be. Such biometrics can be measured by a computer and facial identification trials of bank cards with photos on the bank have proved conclusively that the typical lay person does very poorly at identifying whether the person standing in front of them is indeed the one in the photo. Even trained passport and border control staff are regularly fooled, hence one of the drivers for biometrics at border control. If the user is to authenticate themselves to their phone application using a facial image, attackers need simply hold up a photo of the real person to the camera. So there should be some live detection to prevent this ruse from succeeding.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A transaction security process involving two users, comprising:
    pushing an encrypted video image of a colorgram from a transaction server to a first personal trusted device of a first user for its decryption and display; and
    including in the colorgram an encryption of a set of descriptors for a persona to be imaged, interpreted, and displayed by a second personal trusted device of a second user, wherein such persona displayed mimics the appearance of a first user if authentic;
    authenticating the first user to the first personal trusted device by the colorgram;
    using said set of descriptors with the second personal trusted device to build a composite rendering and display for identification of the first user by the second user; and
    indicating back to the server that the first user has been identified by the second user depending on the composite drawing being recognizable persona and thereby enabling a transaction to be completed.

2. The transaction security process of claim 1, further comprising:
    depending on a network for independent communications between the server and each of the first and second personal trusted devices.

3. A transaction security system includes:
    a processor for pushing an encrypted colorgram with persona descriptors used to build a composite rendering that resembles a first user from a transaction server to a first personal trusted device;
    a processor for decrypting said encrypted colorgram and displaying it on the first personal trusted device;
    a processor for capturing an image of said colorgram displayed by the first personal trusted device by a second personal trusted device;
    a processor for encryption of the image captured from the second personal trusted device and uploading it back to the transaction server;
    a processor for decoding, interpreting, and using the persona descriptors to build and display on the second personal trusted device a composite rendering that should resemble the first user if authentic; and
    a processor for allowing the second user to indicate to the transaction server that they recognize the composite rendering as a reasonable impression of the first user;
    wherein, an associated transaction between independent users respectively equipped with the first and second personal trusted devices is authenticated based on a comparison of the encrypted colorgram that was pushed to the first personal trusted device and displayed, and that was imaged by and what was uploaded from the second personal trusted device.

* * * * *